Patented July 21, 1931

1,815,782

UNITED STATES PATENT OFFICE

HANS KRZIKALLA AND HANS KAEMMERER, OF MANNHEIM, GERMANY, ASSIGNORS TO GENERAL ANILINE WORKS, INC., OF NEW YORK, N. Y., A CORPORATION OF DELAWARE

NEW AZO DYESTUFFS AND METAL COMPOUNDS THEREOF

No Drawing. Application filed August 14, 1929, Serial No. 385,962, and in Germany August 27, 1928.

The present invention relates to new azo dyestuffs and metal compounds thereof.

We have found that valuable new azo dyestuffs are obtained by coupling the diazo compounds of aminosulphosalicylic acids with such phenols as are substituted in the para position to the hydroxy group. For example, the following coupling components among others are suitable: p-cresol, hydroquinone monomethyl ether, 2.4-dimethylphenol, p-hydroxy-diphenylmethane, 4-acetylaminophenol, 3-amino-4-methylphenol, p-chlor-m-cresol and the like. The coupling can be carried out, for example, in the usual manner in an alkaline medium.

The dyestuffs obtained in accordance with the present invention are characterized by good fastness to light and by the ability to produce even dyeings. By after-treatment of the dyestuffs either in substance or on the fiber with compounds of such metals as give complex compounds with azo dyestuffs, the fastness properties can be still further improved. The azo dyestuffs and the metal compounds can also be employed simultaneously in the dyeing.

The following examples will further illustrate the nature of the said invention, but the invention is not restricted to these examples. The parts are by weight.

Example 1

23.3 parts of p-aminosulphosalicylic acid are diazotized in the usual manner, and the mixture containing the diazo compound is then allowed to run into a solution of 11.8 parts of p-cresol containing an excess of alkali metal hydroxide. After the completion of the coupling, the whole is warmed and the azo dyestuff corresponding to the formula:

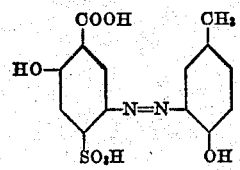

salted out. After drying, the dyestuff is a yellowish powder which dyes wool yellow. By after-treatment with potassium bichromate the dyeings become extremely fast to washing, fulling and light. Similar fast dyeings are obtained by dyeing with the dyestuff in the presence of a salt of trivalent chromium, for example, chromium fluoride, or by converting the dyestuff in substance into the complex chromium compound by treatment with a hot solution of a salt or trivalent chromium.

Example 2

23.3 parts of p-aminosulphosalicylic acid are diazotized and coupled with 12.8 parts of 2.4-dimethylphenol and worked up in the manner described in Example 1. The dyestuff obtained corresponding to the formula:

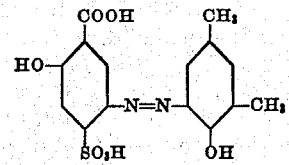

dyes wool somewhat more red than the dyestuff in Example 1. By boiling under a reflux condenser with a solution of chromium formate a chromium compound is obtained, of which the dyeings on wool are very even and fast to washing and fulling. The chromium compound is also suitable for dyeing leather. The complex copper compound of the dyestuff can be obtained by boiling with a solution of a copper salt, and this similarly dyes wool yellow shades.

o-aminosulphosalicylic acid of the formula:

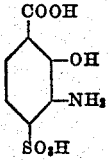

can also be employed as the diazo component instead of p-aminosulphosalicyclic acid. The dyestuffs obtained from this in a corresponding manner dye, generally speaking, more reddish shades than the analogous dyestuffs from p-aminosulphosalicylic acid.

What we claim is:

1. As new articles of manufacture, the azo dyestuffs obtainable by coupling a diazotized aminosulphosalicylic acid with a phenol substituted in the para-position to the hydroxyl group.

2. As new articles of manufacture, the azo dyestuffs obtainable by coupling diazotized p-aminosulphosalicyclic acid with a phenol substitute in the para-position to the hydroxyl group.

3. As new articles of manufacture, the azo dyestuffs obtainable by coupling diazotized p-aminosulphosalicylic acid with p-cresol.

4. As new articles of manufacture, complex metal compounds of the azo dyestuffs obtainable by coupling a diazotized aminosulphosalicylic acid with a phenol substituted in the para-position to the hydroxyl group.

5. As new articles of manufacture, complex metal compounds of the azo dyestuffs obtainable by coupling diazotized p-aminosulphosalicylic acid with a phenol substituted in the para-position to the hydroxyl group.

6. As new articles of manufacture complex chromium compounds of the azo dyestuffs obtainable by coupling a diazotized aminosulphosalicylic acid with a phenol substituted in the para-position to the hydroxyl group.

7. As new articles of manufacture complex chromium compounds of the azo dyestuffs obtainable by coupling diazotized p-aminosulphosalicylic acid with a phenol substituted in the para-position to the hydroxyl group.

8. As a new article of manufacture the complex chromium compound of the azo dyestuff obtainable by coupling diazotized p-aminosulphosalicylic acid with p-cresol.

In testimony whereof we have hereunto set our hands.

HANS KRZIKALLA.
HANS KAEMMERER.